(12) United States Patent
Da Palma et al.

(10) Patent No.: US 7,827,288 B2
(45) Date of Patent: Nov. 2, 2010

(54) MODEL AUTOCOMPLETION FOR COMPOSITE SERVICES SYNCHRONIZATION

(75) Inventors: William V. Da Palma, Coconut Creek, FL (US); Baiju D. Mandalia, Boca Raton, FL (US); Victor S. Moore, Lake City, FL (US); Wendi L. Nusbickel, Boca Raton, FL (US)

(73) Assignee: International Business Machines Corporation, Armonk, NY (US)

( * ) Notice: Subject to any disclaimer, the term of this patent is extended or adjusted under 35 U.S.C. 154(b) by 1080 days.

(21) Appl. No.: 11/296,937

(22) Filed: Dec. 8, 2005

(65) Prior Publication Data

US 2007/0133507 A1    Jun. 14, 2007

(51) Int. Cl.
    *G06F 15/16*    (2006.01)
(52) U.S. Cl. .................. 709/227; 709/200; 709/223; 370/352
(58) Field of Classification Search ............. 709/223, 709/224, 227; 370/352
    See application file for complete search history.

(56) References Cited

U.S. PATENT DOCUMENTS

| | | | |
|---|---|---|---|
| 5,278,943 A | 1/1994 | Gasper et al. | |
| 5,774,551 A | 6/1998 | Wu et al. | |
| 5,781,720 A | 7/1998 | Parker et al. | |
| 5,873,094 A | 2/1999 | Talatik | |
| 6,195,697 B1* | 2/2001 | Bowman-Amuah | 709/224 |
| 6,269,336 B1* | 7/2001 | Ladd et al. | 704/270 |
| 6,272,625 B1 | 8/2001 | DeCarmo | |
| 6,298,370 B1 | 10/2001 | Tang et al. | |
| 6,301,609 B1 | 10/2001 | Aravamudan et al. | |
| 6,317,794 B1 | 11/2001 | Papierniak et al. | |
| 6,351,271 B1 | 2/2002 | Mainwaring et al. | |
| 6,366,771 B1 | 4/2002 | Angle et al. | |
| 6,370,508 B2 | 4/2002 | Beck et al. | |

(Continued)

FOREIGN PATENT DOCUMENTS

CN    1697419 A    11/2005

(Continued)

OTHER PUBLICATIONS

Licciardi et al. Technologies and Guidelines for service creation in NGN, 8th ITU International Conference on Intelligence in Networks 2003.*

(Continued)

*Primary Examiner*—John Follansbee
*Assistant Examiner*—Anthony Mejia
(74) *Attorney, Agent, or Firm*—Jeanine S. Ray-Yarletts, Esq.; Steven M. Greenberg, Esq.; Carey Rodriguez Greenberg & Paul LLP (57) ABSTRACT

Embodiments of the present invention provide a method, system and computer program product for the auto-completion of values in a model in a composite services enablement data processing system. The method can include establishing for a common session, multiple channels of access to a model for a composite service. The method further can include synchronizing views for each of the channels of access based upon detected value changes to data members of the model. Finally, the method can include auto-completing associated values for other data members of the model responsive to receiving a value change for one data member in the model.

17 Claims, 3 Drawing Sheets

U.S. PATENT DOCUMENTS

| | | | | |
|---|---|---|---|---|
| 6,442,547 | B1 * | 8/2002 | Bowman-Amuah | 707/10 |
| 6,523,035 | B1 | 2/2003 | Fleming et al. | |
| 6,606,744 | B1 * | 8/2003 | Mikurak | 717/174 |
| 6,611,867 | B1 * | 8/2003 | Bowman-Amuah | 709/224 |
| 6,618,490 | B1 | 9/2003 | Cham et al. | |
| 6,662,340 | B2 | 12/2003 | Rawat et al. | |
| 6,724,403 | B1 | 4/2004 | Santoro et al. | |
| 6,735,566 | B1 | 5/2004 | Brand | |
| 6,757,362 | B1 | 6/2004 | Cooper et al. | |
| 6,810,429 | B1 | 10/2004 | Walsh et al. | |
| 6,910,074 | B1 | 6/2005 | Amin et al. | |
| 7,023,840 | B2 * | 4/2006 | Golla et al. | 370/360 |
| 7,177,881 | B2 | 2/2007 | Schwesig et al. | |
| 7,203,907 | B2 | 4/2007 | Weng et al. | |
| 7,210,098 | B2 * | 4/2007 | Sibal et al. | 715/205 |
| 7,233,933 | B2 * | 6/2007 | Horvitz et al. | 706/21 |
| 7,330,487 | B2 | 2/2008 | Chang et al. | |
| 7,334,018 | B2 | 2/2008 | Elms | |
| 7,336,628 | B2 | 2/2008 | Chang et al. | |
| 7,337,405 | B2 | 2/2008 | Weng et al. | |
| 7,346,667 | B2 * | 3/2008 | Ashcroft et al. | 709/219 |
| 7,356,567 | B2 | 4/2008 | Odell et al. | |
| 7,525,937 | B2 | 4/2009 | O'Neill | |
| 7,543,237 | B2 * | 6/2009 | Kontny et al. | 715/759 |
| 7,707,249 | B2 * | 4/2010 | Spataro et al. | 709/205 |
| 2001/0016873 | A1 * | 8/2001 | Ohkado et al. | 709/205 |
| 2001/0027474 | A1 | 10/2001 | Nachman et al. | |
| 2001/0034738 | A1 | 10/2001 | Cantwell et al. | |
| 2001/0052023 | A1 | 12/2001 | Lin et al. | |
| 2002/0016736 | A1 | 2/2002 | Cannon et al. | |
| 2002/0052932 | A1 | 5/2002 | Curtis et al. | |
| 2002/0055350 | A1 * | 5/2002 | Gupte et al. | 455/412 |
| 2002/0089539 | A1 | 7/2002 | Lindhorst et al. | |
| 2002/0099602 | A1 | 7/2002 | Moskowitz et al. | |
| 2002/0105909 | A1 | 8/2002 | Flanagan et al. | |
| 2002/0140731 | A1 | 10/2002 | Subramaniam et al. | |
| 2002/0154162 | A1 | 10/2002 | Bhatia et al. | |
| 2002/0169613 | A1 | 11/2002 | Damiba | |
| 2002/0184346 | A1 | 12/2002 | Mani | |
| 2002/0184373 | A1 | 12/2002 | Maes | |
| 2002/0184610 | A1 | 12/2002 | Chong et al. | |
| 2002/0187750 | A1 | 12/2002 | Majumdar | |
| 2002/0194388 | A1 * | 12/2002 | Boloker et al. | 709/310 |
| 2003/0023953 | A1 | 1/2003 | Lucassen et al. | |
| 2003/0026269 | A1 | 2/2003 | Paryani | |
| 2003/0040995 | A1 | 2/2003 | Daddario et al. | |
| 2003/0046088 | A1 | 3/2003 | Yuschik | |
| 2003/0055884 | A1 | 3/2003 | Yuen et al. | |
| 2003/0088421 | A1 | 5/2003 | Maes et al. | |
| 2003/0095540 | A1 | 5/2003 | Mulligan et al. | |
| 2003/0108063 | A1 | 6/2003 | Joseph et al. | |
| 2003/0110297 | A1 | 6/2003 | Tabatabai et al. | |
| 2003/0120813 | A1 | 6/2003 | Majumdar et al. | |
| 2003/0182622 | A1 | 9/2003 | Sibal et al. | |
| 2003/0204561 | A1 | 10/2003 | Briscoe et al. | |
| 2003/0212762 | A1 | 11/2003 | Barnes et al. | |
| 2003/0223381 | A1 | 12/2003 | Schroderus | |
| 2004/0039795 | A1 | 2/2004 | Percival | |
| 2004/0078787 | A1 | 4/2004 | Borek et al. | |
| 2004/0104938 | A1 | 6/2004 | Saraswat et al. | |
| 2004/0128342 | A1 | 7/2004 | Maes et al. | |
| 2004/0133888 | A1 | 7/2004 | Ard et al. | |
| 2004/0172254 | A1 | 9/2004 | Sharma et al. | |
| 2004/0172258 | A1 | 9/2004 | Dominach et al. | |
| 2004/0181461 | A1 | 9/2004 | Raiyani et al. | |
| 2004/0199529 | A1 | 10/2004 | Clark et al. | |
| 2004/0199574 | A1 | 10/2004 | Franco et al. | |
| 2004/0205614 | A1 | 10/2004 | Keswa | |
| 2004/0215824 | A1 | 10/2004 | Payrits | |
| 2004/0230466 | A1 | 11/2004 | Davis et al. | |
| 2004/0250201 | A1 | 12/2004 | Caspi | |
| 2004/0254957 | A1 | 12/2004 | Hyotyniemi et al. | |
| 2004/0255030 | A1 | 12/2004 | Sillanpaa | |
| 2005/0021826 | A1 | 1/2005 | Kumar | |
| 2005/0027495 | A1 | 2/2005 | Matichuk | |
| 2005/0060138 | A1 | 3/2005 | Wang et al. | |
| 2005/0069225 | A1 | 3/2005 | Schneider et al. | |
| 2005/0125541 | A1 | 6/2005 | Frank et al. | |
| 2005/0129198 | A1 * | 6/2005 | Sudhir et al. | 379/90.01 |
| 2005/0132023 | A1 | 6/2005 | Cazzolla et al. | |
| 2005/0136897 | A1 | 6/2005 | Praveenkumar et al. | |
| 2005/0147216 | A1 | 7/2005 | Janakiraman et al. | |
| 2005/0152522 | A1 | 7/2005 | Kumhyr | |
| 2005/0172331 | A1 | 8/2005 | Blackketter et al. | |
| 2005/0198099 | A1 | 9/2005 | Motsinger et al. | |
| 2005/0203944 | A1 | 9/2005 | Dinh et al. | |
| 2005/0251393 | A1 | 11/2005 | Georgescu | |
| 2005/0278444 | A1 * | 12/2005 | Sims et al. | 709/224 |
| 2005/0283364 | A1 | 12/2005 | Longe et al. | |
| 2005/0289461 | A1 * | 12/2005 | Amado et al. | 715/530 |
| 2006/0015600 | A1 | 1/2006 | Piper | |
| 2006/0036770 | A1 * | 2/2006 | Hosn et al. | 709/248 |
| 2006/0069563 | A1 | 3/2006 | Ju et al. | |
| 2006/0074980 | A1 | 4/2006 | Sarkar | |
| 2006/0168002 | A1 | 7/2006 | Chesley | |
| 2006/0195584 | A1 | 8/2006 | Baumann | |
| 2006/0200569 | A1 | 9/2006 | Koch et al. | |
| 2006/0212115 | A1 * | 9/2006 | Garcia-Martin | 709/203 |
| 2006/0282856 | A1 * | 12/2006 | Errico et al. | 725/46 |
| 2006/0287866 | A1 | 12/2006 | Cross et al. | |
| 2007/0005990 | A1 | 1/2007 | Sathish | |
| 2007/0049281 | A1 * | 3/2007 | Chen et al. | 455/445 |
| 2007/0081557 | A1 | 4/2007 | Binetti et al. | |
| 2007/0100981 | A1 | 5/2007 | Adamczyk et al. | |
| 2007/0124507 | A1 | 5/2007 | Gurram et al. | |
| 2007/0180075 | A1 | 8/2007 | Chasman et al. | |

FOREIGN PATENT DOCUMENTS

| | | |
|---|---|---|
| EP | 1199872 A2 | 4/2002 |
| EP | 1411704 A2 | 4/2004 |
| GB | 2389479 | 10/2003 |
| WO | 0005903 A2 | 2/2000 |
| WO | 0131472 | 5/2001 |
| WO | 0221300 A1 | 3/2002 |
| WO | 03056769 A1 | 7/2003 |
| WO | 03079144 A2 | 9/2003 |
| WO | 2004064321 A1 | 7/2004 |

OTHER PUBLICATIONS

Georgescu, S., et al; Multimodal IMS Services: The Adaptive Keyword Spotting Interaction Paradigm; Autonomic & Autonomous Systems & Int'l Conference on Networking & Services; 2005; ICAS-ICNS 2005. Joint Int'l Conference on Papette, Tahiti, Oct. 23-28, 2005, Piscataway, NJ; IEEE, Oct. 23, 2005; pp. 1-6; XP010864688; ISSN: 0-7695-2450-8, p. 1-5.

Engelsma, J., et al; Distributed Multimodal Synchronization Protocol; IETF Standard-Working Draft, Internet Engineering Task Force, IETF, CH, Jul. 8, 2005, pp. 1-71, XP0105041593; ISSN; 0000-0004; pp. 3-8.

Bodell, M., et al; W3C Multimodal Interaction Citation, [Online] May 6, 2003, pp. 1-19, XP002305381; retrieved from the Internet: URL: www.w3.org/TR/mmi-framework/ [retrieved on Nov. 12, 2004] p. 2-18.

Keidl, Markus, et al; Flexible and Reliable Web Service Execution; (http://www-db.in.tum.de/research/publications/conferences/WebServices_Workshop.pdf).

* cited by examiner

MODEL AUTOCOMPLETION FOR COMPOSITE SERVICES SYNCHRONIZATION

REFERENCE TO CO-PENDING APPLICATIONS FOR PATENT

The present application is related to the following co-assigned U.S. patent applications, which are incorporated herein by reference herein:

U.S. application Ser. No. 11/297,536 entitled "COMPOSITE SERVICES DELIVERY", filed on Dec. 8, 2005.

U.S. application Ser. No. 11/297,535 entitled "COMPOSITE SERVICES DELIVERY UTILIZING LIGHTWEIGHT MESSAGING", filed on Dec. 8, 2005.

U.S. application Ser. No. 11/296,952 entitled "INITIATING VOICE ACCESS TO A SESSION FROM A VISUAL ACCESS CHANNEL TO THE SESSION IN A COMPOSITE SERVICES DELIVERY SYSTEM", filed on Dec. 8, 2005.

U.S. application Ser. No. 11/296,939 entitled "AUTO-ESTABLISHMENT OF A VOICE CHANNEL OF ACCESS TO A SESSION FOR A COMPOSITE SERVICE FROM A VISUAL CHANNEL OF ACCESS TO THE SESSION FOR THE COMPOSITE SERVICE", filed on Dec. 8, 2005.

U.S. application Ser. No. 11/297,573 entitled "SYNCHRONIZED VIEW STATE FOR COMPOSITE SERVICES DELIVERY", filed on Dec. 8, 2005.

U.S. application Ser. No. 11/297,211 entitled "MANAGING CONCURRENT DATA UPDATES IN A COMPOSITE SERVICES DELIVERY SYSTEM", filed on Dec. 8, 2005.

U.S. application Ser. No. 11/297,080 entitled "VISUAL CHANNEL REFRESH RATE CONTROL FOR COMPOSITE SERVICES DELIVERY", filed on Dec. 8, 2005.

U.S. application Ser. No. 11/297,497 entitled "SEAMLESS REFLECTION OF MODEL UPDATES IN A VISUAL PAGE FOR A VISUAL CHANNEL IN A COMPOSITE SERVICES DELIVERY SYSTEM", filed on Dec. 8, 2005.

U.S. application Ser. No. 11/297,496 entitled "SELECTIVE VIEW SYNCHRONIZATION FOR COMPOSITE SERVICES DELIVERY", filed on Dec. 8, 2005.

U.S. application Ser. No. 11/297,693 entitled "UPDATE NOTIFICATION FOR PEER VIEWS IN A COMPOSITE SERVICES DELIVERY ENVIRONMENT", filed on Dec. 8, 2005.

U.S. application Ser. No. 11/297,079 entitled "SECURE ACCESS TO A COMMON SESSION IN A COMPOSITE SERVICES DELIVERY ENVIRONMENT", filed on Dec. 8, 2005.

U.S. application Ser. No. 11/297,542 entitled "VIEW COORDINATION FOR CALLERS IN A COMPOSITE SERVICES ENABLEMENT ENVIRONMENT", filed on Dec. 8, 2005.

U.S. application Ser. No. 11/297,541 entitled "COMPOSITE SERVICES ENABLEMENT OF VISUAL NAVIGATION INTO A CALL CENTER", filed on Dec. 8, 2005.

U.S. application Ser. No. 11/297,601 entitled "VOICE NAVIGATION OF A VISUAL VIEW FOR A SESSION IN A COMPOSITE SERVICES ENABLEMENT ENVIRONMENT", filed on Dec. 8, 2005.

U.S. application Ser. No. 11/297,593 entitled "SPEECH DISAMBIGUATION IN A COMPOSITE SERVICES ENABLEMENT ENVIRONMENT", filed on Dec. 8, 2005.

U.S. application Ser. No. 11/297,061 entitled "CHANNEL PRESENCE IN A COMPOSITE SERVICES ENABLEMENT ENVIRONMENT", filed on Dec. 8, 2005.

U.S. application Ser. No. 11/297,594 entitled "COMPOSITE SERVICES GENERATION TOOL", filed on Dec. 8, 2005.

BACKGROUND OF THE INVENTION

1. Field of the Invention

The present invention relates to the field of next generation networking (NGN) and more particularly to the deployment and delivery of composite services over an NGN network.

2. Description of the Related Art

Next generation networking (NGN) refers to emerging computing networking technologies that natively support data, video and voice transmissions. In contrast to the circuit switched telephone networks of days gone by, NGN networks are packet switched and combine voice and data in a single network. Generally, NGN networks are categorized by a split between call control and transport. Also, in NGN networks, all information is transmitted via packets which can be labeled according to their respective type. Accordingly, individual packets are handled differently depending upon the type indicated by a corresponding label.

The IP Multimedia Subsystem (IMS) is an open, standardized, operator friendly, NGN multimedia architecture for mobile and fixed services. IMS is a Voice over Internet Protocol (VoIP) implementation based upon a variant of the session initiation protocol (SIP), and runs over the standard Internet protocol (IP). Telecom operators in NGN networks offer network controlled multimedia services through the utilization of IMS. The aim of IMS is to provide new services to users of an NGN network in addition to currently available services. This broad aim of IMS is supported through the extensive use of underlying IP compatible protocols and corresponding IP compatible interfaces. In this way, IMS can merge the Internet with the wireless, cellular space so as to provide to cellular technologies ubiquitous access useful services deployed on the Internet.

Multimedia services can be distributed both within NGN networks and non-NGN networks, alike, through the use of markup specified documents. In the case of a service having a visual interface, visually oriented markup such as the extensible hypertext markup language (XHTML) and its many co-species can specify the visual interface for a service when rendered in a visual content browser through a visual content channel, for instance a channel governed by the hypertext transfer protocol (HTTP). By comparison, an audio interface can be specified for a service by voice oriented markup such as the voice extensible markup language (VoiceXML). In the case of an audio interface, a separate voice channel, for instance a channel governed according to SIP.

In many circumstances, it is preferred to configure services to be delivered across multiple, different channels of differing modalities, including the voice mode and the visual mode. In this regard, a service provider not always can predict the interactive modality through which a service is to be accessed by a given end user. To accommodate this uncertainty, a service can be prepared for delivery through each anticipated modality, for instance by way of voice markup and visual markup. Generating multiple different markup documents to satisfy the different modalities of access, however, can be tedious. In consequence, merging technologies such as the XHTML+VoiceXML (X+V) have been utilized to simplify the development process.

Specifically, X+V represents one technical effort to produce a multimodal application development environment. In X+V, XHTML and VoiceXML can be mixed in a single document. The XHTML portion of the document can manage visual interactions with an end user, while the VoiceXML portion of the document can manage voice interactions with the end user. In X+V, command, control and content navigation can be enabled while simultaneously rendering multimodal content. In this regard, the X+V profile specifies how to compute grammars based upon the visual hyperlinks present in a page.

Processing X+V documents, however, requires the use of a proprietary browser in the client devices utilized by end users when accessing the content. Distributing multimedia services to a wide array of end user devices, including pervasive devices across NGN networks, can be difficult if one is to assume that all end user devices are proprietarily configured to handle X+V and other unifying technologies. Rather, at best, it can only be presumed that devices within an NGN network are equipped to process visual interactions within one, standard channel of communication, and voice interactions within a second, standard channel of communication.

Thus, despite the promise of X+V, to truly support multiple modalities of interaction with services distributed about an NGN or, even a non-NGN network, different channels of communications must be established for each different modality of access. Moreover, each service must be separately specified for each different modality. Finally, once a session has been established across one modality of access to a service, one is not able to change mid-session to a different modality of access to the same service within the same session. As a result, the interactions across different channels accommodating different modalities of interaction remain unsynchronized and separate. Consequently, end users cannot freely switch between modalities of access for services in an NGN network.

BRIEF SUMMARY OF THE INVENTION

Embodiments of the present invention address deficiencies of the art in respect to deploying and delivering a service to be accessed through different channels of access in an NGN network, and provide a novel and non-obvious method, system and apparatus for deploying and delivering composite services in an NGN network. As used herein, a composite service is a service deployed across an NGN network that has been enabled to be accessed through multiple, different modalities of access in correspondingly different channels while maintaining the synchronization of the state of the service between the different channels of access.

In a first embodiment of the invention, an auto-completion method for values in a model in a composite services enablement data processing system can include establishing for a common session, multiple channels of access to a model for a composite service. The method further can include synchronizing views for each of the channels of access based upon detected value changes to data members of the model. Finally, the method can include auto-completing associated values for other data members of the model responsive to receiving a value change for one data member in the model.

In one aspect of the embodiment, auto-completing associated values for other data members of the model can include receiving a value for changing a data member of the model, matching other values associated with the received value for other data members of the model, and updating each data member of the model according to the received value and matched other values. Optionally, instead of directly updating the model with the matched values, only the fields in a form within a view can be updated to reflect the received value and matched other values.

In another embodiment of the invention, a composite service enabling data processing system can include channel servlets enabled to establish for a single session, multiple different communication channels for corresponding different channels of access to a composite service, a location registry including a table of entries associating the different communication channels with the single session for the composite service, and a model servlet configured for coupling to a model for the single session, for modifying state data in the model for the single session, and to synchronize views for each of the different channels of access to the composite service responsive to changes detected in the model. Importantly, the system auto-completion logic can be coupled to the model.

The auto-completion logic can include program code enabled to auto-complete values for data members in the model responsive to receiving an associated value for a data member in the model as part of a change detected in the model. In this regard, the auto-completion logic can be coupled to the model through the model servlet. Alternatively, the auto-completion logic can be coupled to the model through a listener to the model. As yet another alternative, the auto-completion logic can be disposed in an applet executing in one of the views. Regardless, the channel servlets and model servlet can be disposed in an IMS in an NGN network.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention provide a method, system and computer program product for delivering composite services in an NGN network. In accordance with an embodiment of the present invention, different channels of access to a service can be established for accessing a service through corresponding different modalities of access including voice and visual modes. Specifically, interactions with a service within a session can be provided across selected ones of the different channels, each channel corresponding to a different modality of access to the service. In the case of a voice modality and a visual modality, a separate markup document can be utilized in each selected channel according to the particular modality for that channel.

Importantly, each channel utilized for accessing a service within a session can be associated with each other channel accessing the service within the same session. In consequence, the state of the service—stored within a model in a model-view-controller architecture—can be maintained irrespective of the channel used to change the state of the service. Moreover, the representation of the service can be synchronized in each view for the selected ones of the different channels. As such, an end user can interact with the service in a single session across different channels of access using different modalities of access without requiring burdensome, proprietary logic deployed within a client computing device.

In accordance with the present invention, updates to portions of the model can trigger auto-completion of other portions of the model. For instance, values for data fields in the model can be associated with values for other data fields in the model. In this way, when a value is provided as an update to the model for a data field, the values for the other data fields which are associated with the provided value can be applied to the update as well. In one aspect of the invention, the auto-completed values can be applied within the composite services enablement data processing system as an update to the model before synchronizing the update to different views for different channels of access to the common session. Alternatively, the auto-completed values can be applied to each individual view when the provided value is synchronized to the view. In the latter circumstance, the logic for performing auto-completion can operate within an end point to the different channels of access to the common session.

Figure 1:
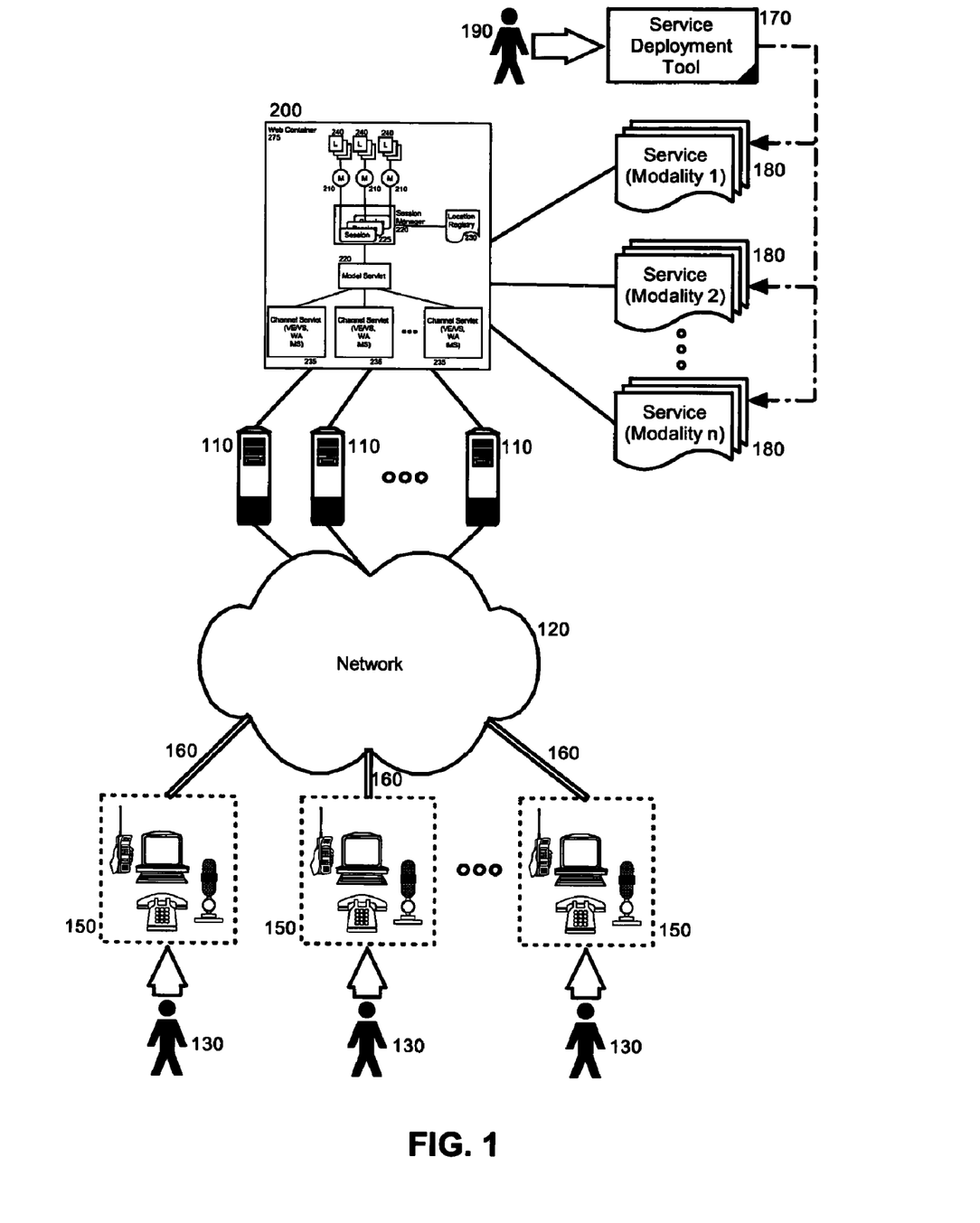
FIG. 1 is a pictorial illustration of an IMS configured for use with a data processing system arranged to deploy and deliver composite services in an NGN network.

Advantageously, the system of the present invention can be embodied within an IMS in a NGN network. In illustration, FIG. 1 is a pictorial illustration of an IMS configured for use with a data processing system enabled to establish a voice channel of access to a session for a composite service from a visual channel of access to the session in an NGN network. As shown in FIG. 1, a composite service enablement data processing system 200 can be arranged to deploy and deliver a composite multimedia service 180 in an NGN network 120. As used herein, a "composite multimedia service" can be a service configured to be accessed through multiple different views of different modalities across correspondingly different channels of communications.

More specifically, the composite multimedia service 180 can be accessed through several different modalities, including a visual mode, an instant messaging mode and a voice mode. Each modality of access can be produced by a developer 190 through the use of a service deployment tool 170. The service deployment tool 170 can be configured to produce the different modalities of access for the composite multimedia service 180, including visual markup to provide visual access to the composite multimedia service 180, and voice markup to provide audible access to the composite multimedia service 180.

One or more gateway server platforms 110 can be coupled to the composite service enablement data processing system 200. Each of gateway server platforms 110 can facilitate the establishment of a communication channel for accessing the composite multimedia service 180 according to a particular modality of access. For example, the gateway server platforms 110 can include a content server such as a Web server enabled to serve visual markup for accessing the composite multimedia service 180 over the NGN network 120 through a visual mode. Likewise, the gateway server platforms 110 can include a voice server enabled to provide audible access to the composite multimedia service 180 over the NGN network 120 through an audible mode.

End users 130 can access the composite multimedia service 180 utilizing any one of a selection of client access devices 150. Application logic within each of the client access devices 150 can provide an interface for a specific modality of access. Examples include a content browser within a personal computing device, an audible user interface within a pervasive device, a telephonic user interface within a telephone handset, and the like. Importantly, each of the provided modalities of access can utilize a separate one of multiple channels 160 established with a corresponding gateway server platform 110 over the network 120 for the same session with the composite multimedia service 180. In this regard, a session with the composite multimedia service 180 can subsist across the multiple channels 160 to provide different modalities of access to the composite multimedia service 180 for one of the end users 130.

Figure 2:
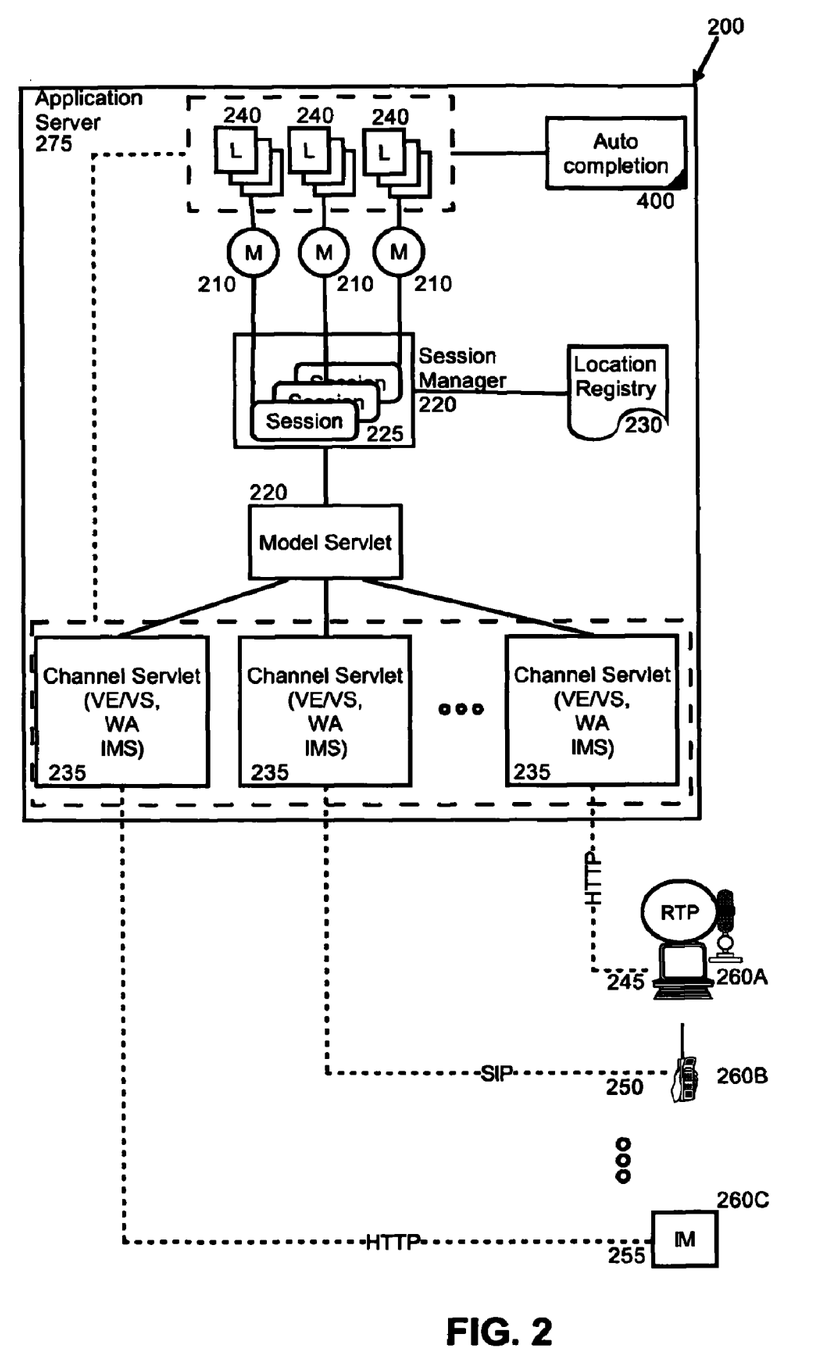
FIG. 2 is a schematic illustration of a data processing system arranged to deploy and deliver composite services in an NGN network.

In more particular illustration, FIG. 2 is a schematic illustration of the composite service enablement data processing system 200 of FIG. 1. The composite service enablement data processing system 200 can operate in an application server 275 and can include multiple channel servlets 235 configured to process communicative interactions with corresponding sessions 225 for a composite multimedia service over different channels of access 245, 250, 255 for different endpoint types 260A, 260B, 260C in an NGN network. In this regard, the channel servlets 235 can process voice interactions as a voice enabler and voice server to visual endpoint 260A incorporating a voice interface utilizing the Real Time Protocol (RTP) over HTTP, or a voice endpoint 260B utilizing SIP. Likewise, the channel servlets 235 can process visual interactions as a Web application to a visual endpoint 160A. As yet another example, the channel servlets 235 can process instant message interactions as an instant messaging server to an instant messaging endpoint 260C.

More specifically, the channel servlets 235 can be enabled to process HTTP requests for interactions with a corresponding session 225 for a composite multimedia service. The HTTP requests can originate from a visual mode oriented Web page over a visual channel 245, from a visual mode oriented instant messaging interface over an instant messaging channel 255, or even in a voice mode over a voice channel 250 enabled by SIP. Similarly, the channel servlets 235 can be enabled to process SIP requests for interactions with a corresponding session 225 for a composite multimedia service through a voice enabler which can include suitable voice markup, such as VoiceXML and call control extensible markup language (CCXML) coupled to a SIPlet which, in combination, can be effective in processing voice interactions for the corresponding session 225 for the composite multimedia service, as it is known in the art.

Each of the channel servlets 235 can be coupled to a model servlet 220. The model servlet 220 can mediate interactions with a model 210 for an associated one of the sessions 225. Each of the sessions 225 can be managed within a session manager 220 which can correlate different channels of communication established through the channel servlets 235 with a single corresponding one of the sessions 225. The correlation of the different channels of communication can be facilitated through the use of a coupled location registry 230. The location registry 230 can include a table indicating a host name of systems and channels active for the corresponding one of the sessions 225.

The model servlet 215 can include program code enabled to access a model 210 for a corresponding session 225 for a composite multimedia service providing different channels of access 245, 250, 255 through different endpoints 260A, 260B, 260C. For instance, the model 210 can be encapsulated within an entity bean within a bean container. Moreover, the model 210 can store session data for a corresponding one of the sessions 225 irrespective of the channel of access 245, 250, 255 through which the session data for the corresponding one of the sessions 225 is created, removed or modified. Finally, model auto-completion logic 400 can be coupled to the model servlet 220. The model auto-completion logic 400 can include program code enabled to auto-complete updates to the model 210 based upon values for data members of the model 210 provided during an update to the model 210.

Notably, changes in state for each of the sessions 225 for a composite multimedia service can be synchronized across the different views 260 for the different channels of access 245, 250, 255 through a listener architecture. The listener architecture can include one or more listeners 240 for each model 210. Each listener can correspond to a different channel of access 245, 250, 255 and can detect changes in state for the model 210. Responsive to detecting changes in state for the model 210 for a corresponding one of the sessions 225 for a composite multimedia service, a listener 240 can provide a notification to subscribing view 260 through a corresponding one of the channel servlets 235 so as to permit the subscribing views 260 to refresh to incorporate the detected changes in state for the model 210. Optionally, the model auto-completion logic 400 can be coupled to each listener 240 rather than the model servlet 220 such that auto-completion of model updates can be performed through the listeners 240.

Figure 3:
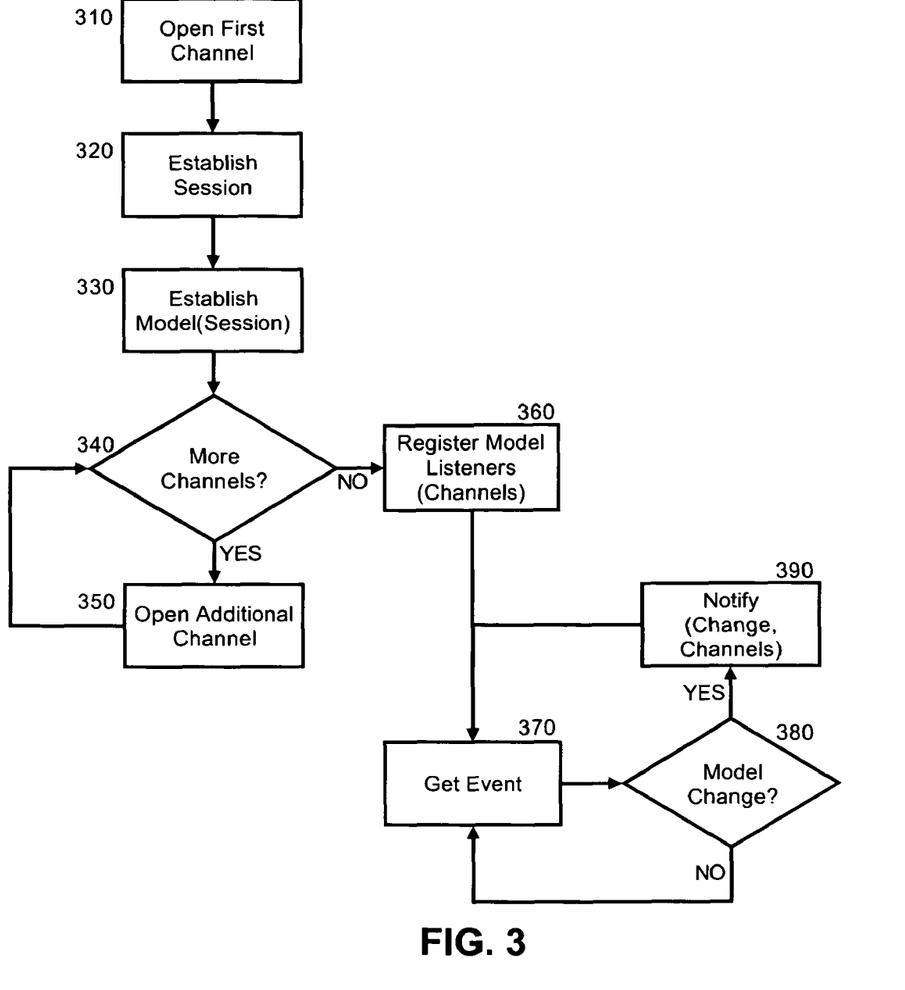
FIG. 3 is a flow chart illustrating a process for delivering composite services in an NGN network; and, FIG. 4 is a flow chart illustrating a process for auto-completing model data in the composite services enablement data processing system of FIG. 2.

FIG. 3 is a flow chart illustrating a process for managing multiple channels of access to a single session for a composite service in the data processing system of FIG. 2. Beginning in block 310, a first channel of access can be opened for the composite multimedia service and a session can be established in block 320 with the composite multimedia service. Data for the session can be stored in a model for the session which can be established in block 330. If additional channels of access are to be established for the session in decision block 340, the process can continue in block 350. In block 350, an additional channel of access can be established for the same session for as many additional channels as required.

When no further channels of access are to be established in decision block 340, in block 360 a listener can be registered for each established channel of access for the session. Subsequently, in block 370 events can be received in each listener. In decision block 380, when a model change is detected, in block 390, the model change can be provided to each endpoint for selected ones of the established channels of access. In consequence, the endpoints can receive and apply the changes to corresponding views for the selected ones of the established channels of access for the same session, irrespective of the particular channel of access through which the changes to the model had been applied.

Figure 4:
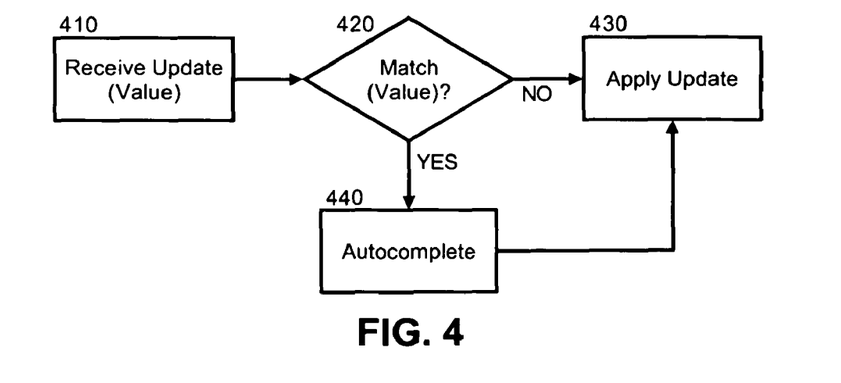

Notably, updates to portions of the model can trigger auto-completion of other portions of the model. In illustration, FIG. 4 is a flow chart illustrating a process for auto-completing model data in the composite services enablement data processing system of FIG. 2. Beginning in block 410, an update to the model can be provided to the composite services enablement data processing system. The update can include a specified value for a data member of the model. For example, the update can include a specified value for a field in a form represented within the model. In decision block 420, the value can be referenced in a table to determine if other values for other data members in the model have been associated with the provided value. If not, in block 430 the update to the model can be applied and synchronized across the different views. Otherwise, in block 440, the model can be auto-completed.

In this regard, values associated with the value provided for the update can be retrieved for other data members in the model. Subsequently, all of the values can be applied to the model and subsequently synchronized to the different views over different channels of access to the session for the model. In this circumstance, the logic for performing auto-completion can reside as an auxiliary function of either the model servlet or a listener to the model for a particular channel of access to the session for the model. Alternatively, the auto-completion logic can reside in a view for a channel of access as an applet provided by the composite services enablement data processing system. In the latter circumstance, auto-completion can occur as a function of populating the fields of a form in the view in response to receiving an updated value for only one of the fields in the form.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, or transport the program for use by or in connection with the instruction execution system, apparatus, or device. The medium can be an electronic, magnetic, optical, electromagnetic, or semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. An auto-completion method for values in a model in a composite services enablement data processing system, the method comprising:

establishing for a common session, multiple channels of access to a model for a composite service, each of the channels of access providing a different view to the common session each different view providing a plurality of fields in a form;

detecting a change to a data member of the model corresponding to one field in one view for one of the channels of access to the common session;

synchronizing corresponding fields in other views for others of the channels of access based upon the detected change to the data member of the model; and, auto-completing other data members of the model and corresponding fields in the other views based upon the detected change to the data member of the model.

2. The method of claim 1, wherein establishing for a common session, multiple channels of access to a model for a composite service, comprises establishing for the common session at least a channel of communication for voice mode of access to the service, and a channel of communication for a visual mode of access to the service.

3. The method of claim 1, wherein establishing for a common session, multiple channels of access to a model for a composite service, comprises establishing for a common session, multiple channels of communication in a next generation networking (NGN) network for at least a channel of communication for a voice mode of access to the service, and a channel of communication for a visual mode of access to the service.

4. The method of claim 1, wherein synchronizing corresponding fields in other views for others of the channels of access based upon the detected change to the data member of the model, comprises:

creating listeners for value changes for data members of the model;

detecting value changes for data members in the model in the listeners; and, updating the corresponding fields in the other views for each of the channels of access responsive to detecting the value changes in the listeners.

5. The method of claim 1, wherein auto-completing other data members of the model and corresponding fields in the other views based upon the detected change to the data member of the model, comprises:

receiving a value for changing a data member of the model;

matching other values associated with the received value for other data members of the model; and, updating each data member of the model according to the received value and matched other values.

6. The method of claim 1, wherein auto-completing other data members of the model and corresponding fields in the other views based upon the detected change to the data member of the model, comprises:

receiving a value for changing a data member of the model;

matching other values associated with the received value for other data members of the model; and, updating fields in a form within a view to reflect the received value and matched other values.

7. A composite service enabling data processing system comprising:

a plurality of channel servlets executing in an application server in a data processing system for storing and executing program code including at least one processor coupled to memory elements through a system bus, the servlets enabled to establish multiple different channels of access to a common session for a composite service each of the channels of access providing a different view to the common session each different view providing a plurality of fields in a form;

a location registry coupled to the application server comprising a table of entries associating the different channels of access with the common session for the composite service; and, a model servlet executing in the application server and configured for coupling to a model for the common session, for modifying state data in the model for the common session, and to synchronize views for each of the different channels of access to the common session responsive to changes detected in the model; and, auto-completion logic coupled to the model, the auto-completion logic comprising program code enabled to auto-complete values for data members in the model and corresponding fields of different forms in different ones of the views responsive to receiving an associated value for a data member in the model as part of a change detected in the model.

8. The system of claim 7, wherein the auto-completion logic is coupled to the model through the model servlet.

9. The system of claim 7, wherein the auto-completion logic is coupled to the model through a listener to the model.

10. The system of claim 7, wherein the auto-completion logic is disposed in an applet executing in one of the views.

11. The system of claim 7, wherein the channel servlets and model servlet are disposed in an Internet protocol (IP) multimedia subsystem (IMS) in a next generation networking (NGN) network.

12. A computer program product comprising a non-transitory medium having computer usable program code for auto-completion of values in a model in a composite services enablement data processing system, the computer program product including:

computer usable program code for establishing for a common session, multiple channels of access to a model for a composite service, each of the channels of access providing a different view to the common session each different view providing a plurality of fields in a form;

computer usable program code for detecting a change to a data member of the model corresponding to one field in one view for one of the channels of access to the common session;

computer usable program code for synchronizing corresponding fields in other views for others of the channels of access based upon the detected change to the data member of the model; and, computer usable program code for auto-completing other data members of the model and corresponding fields in the other views based upon the detected change to the data member of the model.

13. The computer program product of claim 12, wherein the computer usable program code for establishing for a common session, multiple channels of access to a model for a composite service, comprises computer usable program code for establishing for the common session at least a channel of communication for voice mode of access to the service, and a channel of communication for a visual mode of access to the service.

14. The computer program product of claim 12, wherein the computer usable program code for establishing for a common session, multiple channels of access to a model for a composite service, comprises computer usable program code for establishing for a common session, multiple channels of communication in a next generation networking (NGN) network for at least a channel of communication for a voice mode of access to the service, and a channel of communication for a visual mode of access to the service.

15. The computer program product of claim 12, wherein the computer usable program code for synchronizing corresponding fields in other views for others of the channels of access based upon the detected change to the data member of the model, comprises:

computer usable program code for creating listeners for value changes for data members of the model;

computer usable program code for detecting value changes for data members in the model in the listeners; and, computer usable program code for updating the view for each of the channels of access responsive to detecting the value changes in the listeners.

16. The computer program product of claim 12, wherein the computer usable program code for auto-completing other data members of the model and corresponding fields in the other views based upon the detected change to the data member of the model, comprises:

computer usable program code for receiving a value for changing a data member of the model;

computer usable program code for matching other values associated with the received value for other data members of the model; and, computer usable program code for updating each data member of the model according to the received value and matched other values.

17. The computer program product of claim 12, wherein the computer usable program code for auto-completing other data members of the model and corresponding fields in the other views based upon the detected change to the data member of the model, comprises:

computer usable program code for receiving a value for changing a data member of the model;

computer usable program code for matching other values associated with the received value for other data members of the model; and, computer usable program code for updating fields in a form within a view to reflect the received value and matched other values.

* * * * *